US012576684B2

(12) United States Patent
Dempsey et al.

(10) Patent No.: US 12,576,684 B2
(45) Date of Patent: Mar. 17, 2026

(54) FAULT DETECTION OF SUSPENSION HEIGHT SENSORS WITHIN A SEMI-ACTIVE VEHICLE SUSPENSION

(71) Applicant: Ford Global Technologies, LLC, Dearborn, MI (US)

(72) Inventors: Rick Dempsey, Milford, NH (US); Jason Wallace Michener, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 18/593,443

(22) Filed: Mar. 1, 2024

(65) Prior Publication Data

US 2025/0276556 A1 Sep. 4, 2025

(51) Int. Cl.
B60G 17/0185 (2006.01)
B60G 17/019 (2006.01)

(52) U.S. Cl.
CPC ....... B60G 17/0185 (2013.01); B60G 17/019 (2013.01); *B60G 2400/204* (2013.01); *B60G 2400/25* (2013.01); *B60G 2600/08* (2013.01); *B60G 2800/914* (2013.01)

(58) Field of Classification Search
CPC .......................... B60G 17/0185; B60G 17/019
See application file for complete search history.

(56) References Cited

U.S. PATENT DOCUMENTS

| | | | | | |
|---|---|---|---|---|---|
| 4,550,286 | A | * | 10/1985 | Holland | B60G 17/0408 |
| | | | | | 324/511 |
| 4,725,072 | A | * | 2/1988 | Asami | B60G 17/0165 |
| | | | | | 280/5.517 |
| 4,729,580 | A | * | 3/1988 | Buma | B60G 17/0165 |
| | | | | | 280/5.513 |
| 4,744,589 | A | * | 5/1988 | Buma | B60G 21/0556 |
| | | | | | 280/5.514 |
| 5,877,680 | A | * | 3/1999 | Okuchi | B60Q 1/115 |
| | | | | | 362/464 |
| 6,193,398 | B1 | * | 2/2001 | Okuchi | B60Q 1/115 |
| | | | | | 362/465 |

(Continued)

FOREIGN PATENT DOCUMENTS

EP 4141406 A1 3/2023

*Primary Examiner* — Long T Tran
(74) *Attorney, Agent, or Firm* — Burr & Forman; Lorne Forsythe

(57) ABSTRACT

A control system for a suspension system of a vehicle may include a set of suspension height sensors that may be operably coupled to a set of wheels of the vehicle, a vehicle speed sensor that may be operably coupled to the vehicle; and a controller that may be operably coupled the set of suspension height sensors and the vehicle speed sensor. The controller may be configured to receive the current suspension height data and the vehicle speed data, may determine whether the vehicle may be in a steady-state condition based on the vehicle speed data, responsive to the vehicle being determined to be in the steady-state condition, may perform a comparison of the current suspension height data to a variable range, a fixed range, and a fixed threshold of suspension height data; and may determine an operation state of the individual suspension height sensor based on the comparison.

20 Claims, 6 Drawing Sheets

(56) References Cited

U.S. PATENT DOCUMENTS

| | | | |
|---|---|---|---|
| 6,470,248 B2 * | 10/2002 | Shank | F15B 15/2884 |
| | | | 701/37 |
| 10,214,070 B2 | 2/2019 | Kasuga et al. | |
| 2006/0142916 A1 * | 6/2006 | Onuma | B60G 21/067 |
| | | | 280/5.506 |
| 2015/0073744 A1 * | 3/2015 | Herrera | G01B 21/22 |
| | | | 702/141 |
| 2015/0361940 A1 * | 12/2015 | Ishii | F02N 11/084 |
| | | | 701/112 |
| 2017/0129298 A1 * | 5/2017 | Lu | B60G 17/015 |
| 2017/0278194 A1 | 9/2017 | Macneille et al. | |
| 2017/0297402 A1 | 10/2017 | Chen et al. | |
| 2022/0314727 A1 * | 10/2022 | Morishita | B60G 17/0525 |
| 2023/0242131 A1 | 8/2023 | Kasaiezadeh et al. | |
| 2024/0203172 A1 * | 6/2024 | Subramanian | B60K 17/36 |

* cited by examiner

100

Vehicle 110

| Front Left Wheel Assembly 120 | Rear Left Wheel Assembly 130 | Front Right Wheel Assembly 140 | Rear Right Wheel Assembly 150 |

160          160          160          160

Controller 200

Comparison Module 210          Communication Module 220

User Interface 221

Service Technician 352

Figure 2:
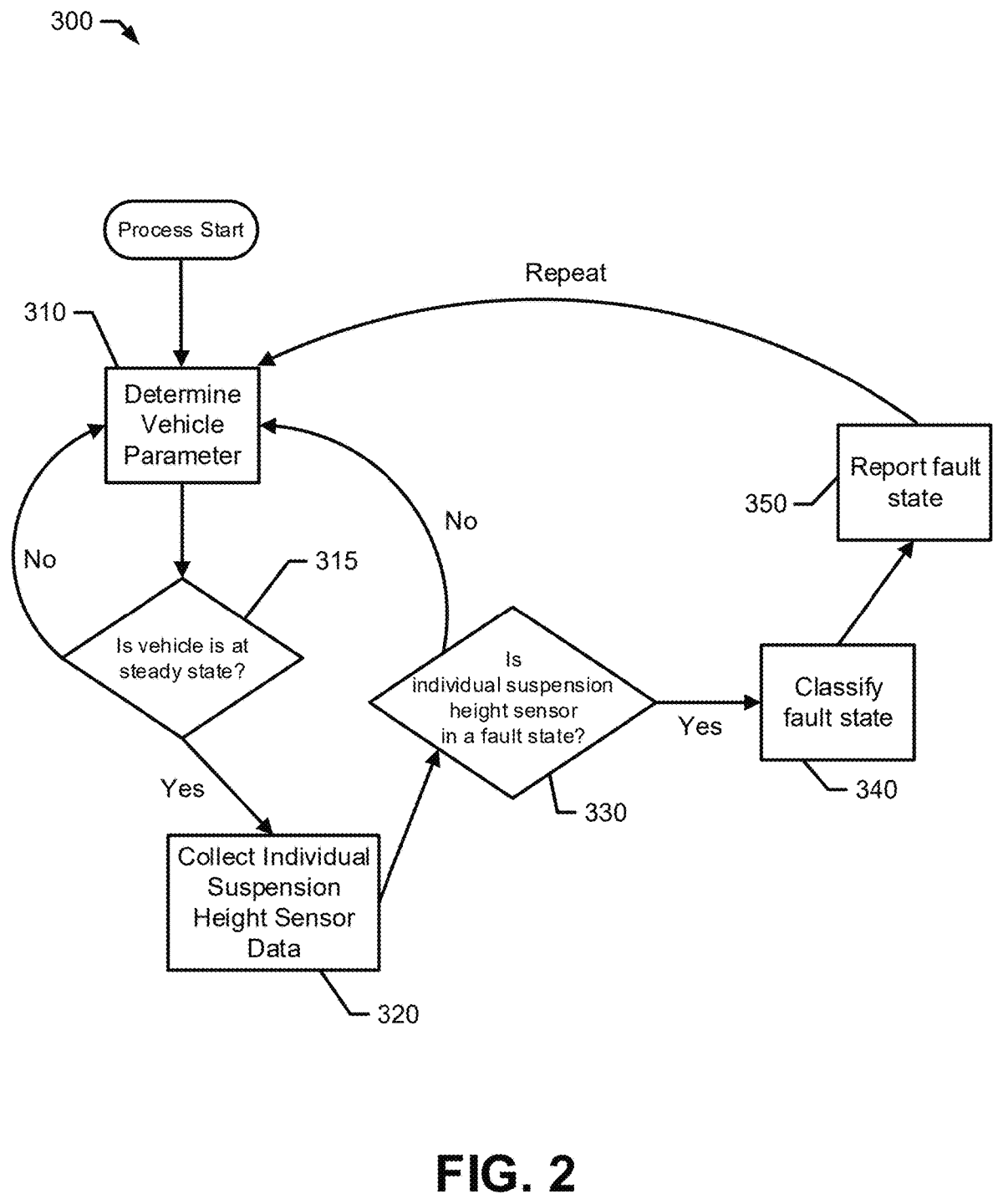

300

Process Start

310

Repeat

Determine
Vehicle
Parameter

Report fault
state

350

No

No

315

Is vehicle is at
steady state?

Is
individual suspension
height sensor
in a fault state?

330

Classify
fault state

340

Yes

Yes

Collect Individual
Suspension
Height Sensor
Data

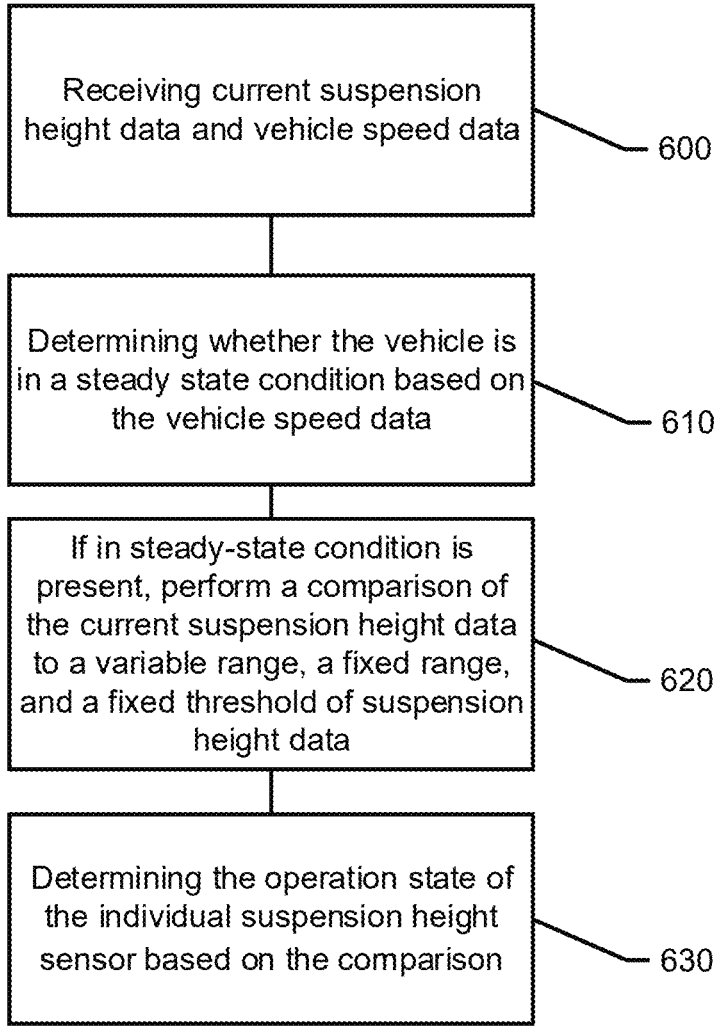

Receiving current suspension height data and vehicle speed data — 600

Determining whether the vehicle is in a steady state condition based on the vehicle speed data — 610

If in steady-state condition is present, perform a comparison of the current suspension height data to a variable range, a fixed range, and a fixed threshold of suspension height data — 620

Determining the operation state of the individual suspension height sensor based on the comparison — 630

FIG. 6

FAULT DETECTION OF SUSPENSION HEIGHT SENSORS WITHIN A SEMI-ACTIVE VEHICLE SUSPENSION

TECHNICAL FIELD

Example embodiments generally relate to the operation of a vehicle's control system and, more particularly, relate to a control system for determining an operation state of a suspension height sensor.

BACKGROUND

Modern vehicles have begun to utilize semi-active suspensions to continuously modify damping levels of a vehicle's suspension system to adjust to varying road conditions. Suspension height sensors are useful for these modern semi-active suspension systems, as they provide accurate and current suspension height data to help control the damping levels. However, detecting and classifying mechanical-specific suspension height sensor faults is presently difficult. Due to the importance of suspension height data in damping adjustment, it would be useful to be able to detect and classify sensor faults quickly to ensure accurate suspension adjustment.

Thus, it may be desirable to be able to quickly and accurately define and classify suspension height sensor faults in order to properly notify a vehicle operator or service technician.

BRIEF SUMMARY OF SOME EXAMPLES

In accordance with an example embodiment, a control system for a suspension system of a vehicle may be provided. The control system may include a set of suspension height sensors that may be operably coupled to a set of wheels of the vehicle for measuring current suspension height data, a vehicle speed sensor that may be operably coupled to the vehicle for measuring vehicle speed data; and a controller that may be operably coupled the set of suspension height sensors and the vehicle speed sensor. The set of suspension height sensors may include multiple instances of an individual suspension height sensor that may be operably coupled to corresponding ones of the set of wheels. The controller may be configured to receive the current suspension height data and the vehicle speed data, may determine whether the vehicle may be in a steady-state condition based on the vehicle speed data, responsive to the vehicle being may being determined to be in the steady-state condition, may perform a comparison of the current suspension height data to a variable range, a fixed range, and a fixed threshold of suspension height data; and may determine an operation state of the individual suspension height sensor based on the comparison.

In another example embodiment, a method for determining an operation state in a suspension system element of a vehicle may be provided. The method may include receiving current suspension height data and vehicle speed data, may determine whether the vehicle may be in a steady-state condition based on the vehicle speed data, responsive to the vehicle being determined to be in the steady-state condition, may perform a comparison of the current suspension height data to a variable range, a fixed range, and a fixed threshold of suspension height data, and may determine the operation state of the individual suspension height sensor based on the comparison. The sensor suite may include a set of suspension height sensors that may be operably coupled to a set of wheels of the vehicle for measuring the current suspension height data and a vehicle speed sensor that may be operably coupled to vehicle for measuring the vehicle speed. The set of suspension height sensors may include multiple instances of individual suspension height sensor that may be operably coupled to corresponding ones of the set of wheels.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 illustrates a flow chart of an algorithm for detecting an operation state in an individual suspension height sensor in accordance with an example embodiment;

FIG. 6 illustrates a block diagram of a method in accordance with an example embodiment.

DETAILED DESCRIPTION

Figure 1:
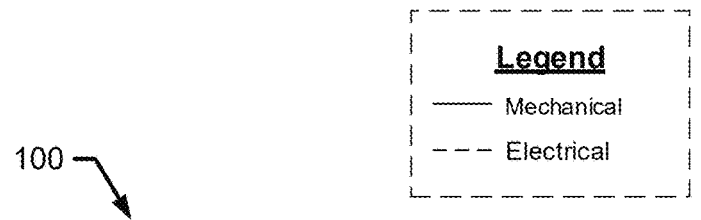
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates a block diagram of a control system 100 according to an example embodiment. The components of the control system 100 may be incorporated into a vehicle 110 (e.g., may be operably coupled to a chassis of the vehicle 110, various components of the vehicle 110 and/or electronic control systems of the vehicle 110). In some cases, the chassis may include or be defined by a frame, and the frame may additionally be formed of one or more casted subframes. Of note, although the components of FIG. 1 may be operably coupled to the vehicle 110 and to each other, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include a set of wheel assemblies. For example, the set of wheel assemblies may include a front left wheel assembly 120, a rear left wheel assembly 130, a front right wheel assembly 140, and a rear right wheel assembly 150. The set of wheel assemblies may include multiple instances of an individual suspension height sensor 160 operably coupled to corresponding ones of the set of wheel assemblies. In some cases, the set of wheel assemblies may include various additional suspension system components which may include corresponding shocks, motion sensors for measuring rate of change of velocity, wheel bearings, brakes assemblies, and wheel hubs that are operably coupled to the corresponding ones of the set of wheel assemblies.

In an example embodiment, the individual suspension height sensor 160 may measure suspension height data, which may include suspension height, vehicle or wheel assembly ride height, wheel assembly position, or various other parameters of set of wheel assemblies. The various other parameters of the individual wheel assembly may be parameters such as velocity or rate of change of velocity that may be derived from position data, which may be measured by the individual suspension height sensor 160. The individual suspension height sensor 160 may be a rotary suspension height sensor that may utilize a rotary arm to measure suspension height data. In some cases, the individual suspension height sensor 160 may be a linear position sensor which may be operably coupled to a shock of the wheel assembly. In an example embodiment, the linear position sensor may be a Hall sensor, which may utilize the Hall effect to determine suspension height data of the corresponding ones of the set of wheel assemblies. The linear position sensor may be an inductive sensor, hall sensor, or sensor/any other sensing technology used to determine suspension movement (either position or rate of change of velocity). In some cases, the individual suspension height sensor 160 may be any type of sensor that may measure suspension height data of the corresponding ones of the set of wheel assemblies. In an example embodiment, the individual suspension height sensor 160 may measure voltage measurements as the suspension height data and may correlate the voltage measurements to determine the suspension height data.

Additionally, the control system 100 may further include a controller 200. While the controller 200 may have many functions, one such function of the controller 200 may be monitoring the status of other components of the vehicle 110. The components that the controller 200 may monitor the status of may be included in, or not included in, the control system 100. In this regard, the controller 200 may be responsible for detecting any faults associated with the components of the vehicle 110. In an example embodiment, the controller 200 may receive information that may be used to determine the status of various components or subassemblies of the vehicle 110 via various sensors that may be operably coupled to the components or subassemblies. Such sensors may be part of a sensor network and sensors of the sensor network may be operably coupled to the controller 200 (and/or the components or subassemblies). In some cases, the controller 200 may communicate the status of certain components in the vehicle 110 to other components in the vehicle 110, so that appropriate action may be taken to ensure the vehicle 110 may continue operating without any components that may be experiencing a fault.

In some cases, the controller 200 may include a comparison module 210 and a communication module 220. The comparison module 210 may be primarily responsible for determining if a fault may be occurring within the control system 100. The communication module 220 may be responsible for communicating information internally within the vehicle 110 or externally to other controllers or devices. The communication module 220 may communicate wirelessly, via a wired connection, or via any other communication protocol, method, or technique that may provide reliable communication between the controller 200 and the target device or destination. In an example embodiment, the communication module 220 may communicate with a user interface 221 of the vehicle 110 or with a service technician 352.

Figure 3:
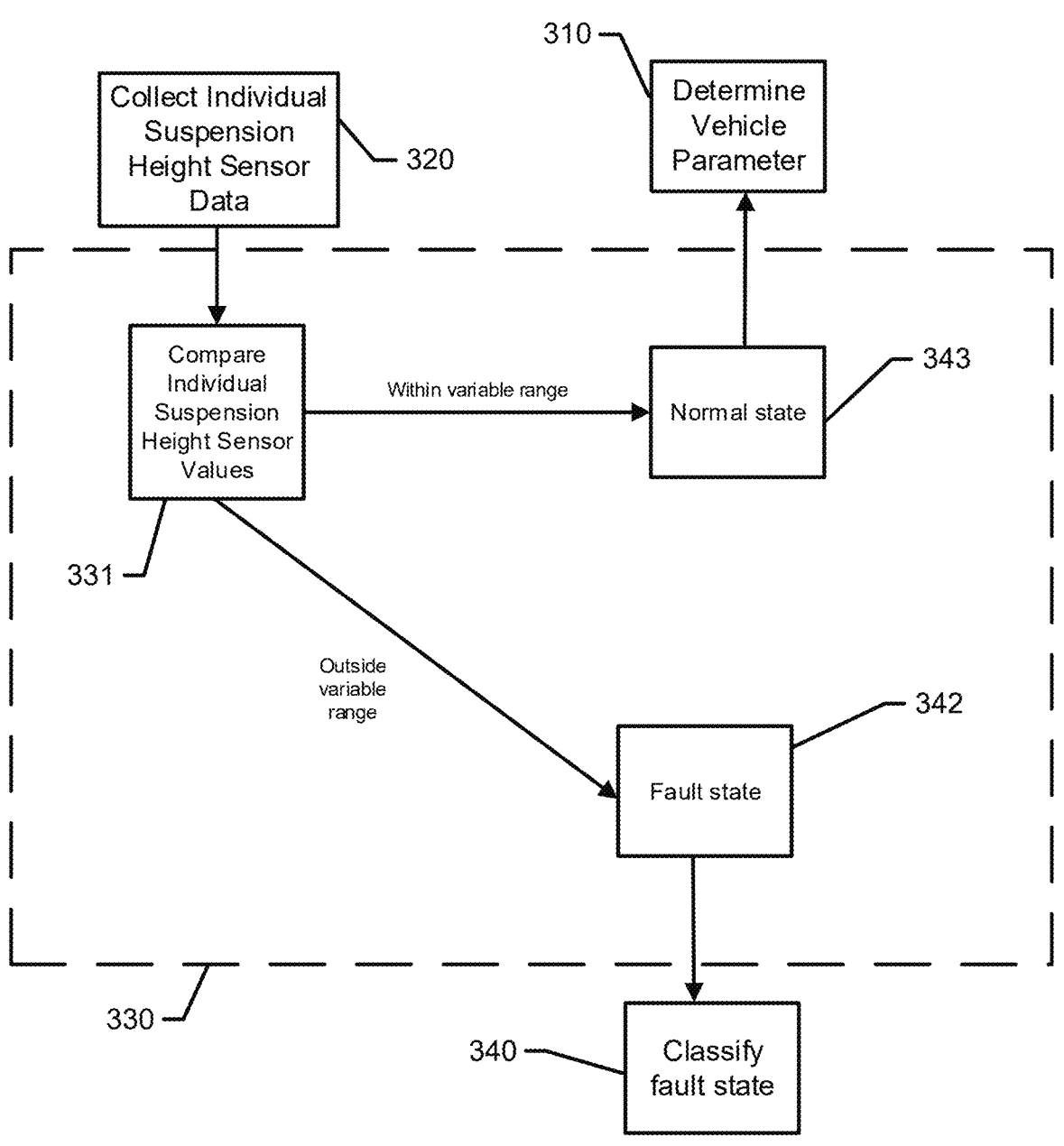
FIG. 3 illustrates a flow chart for determining if a fault state may be occurring in accordance with an example embodiment.
Figure 4:
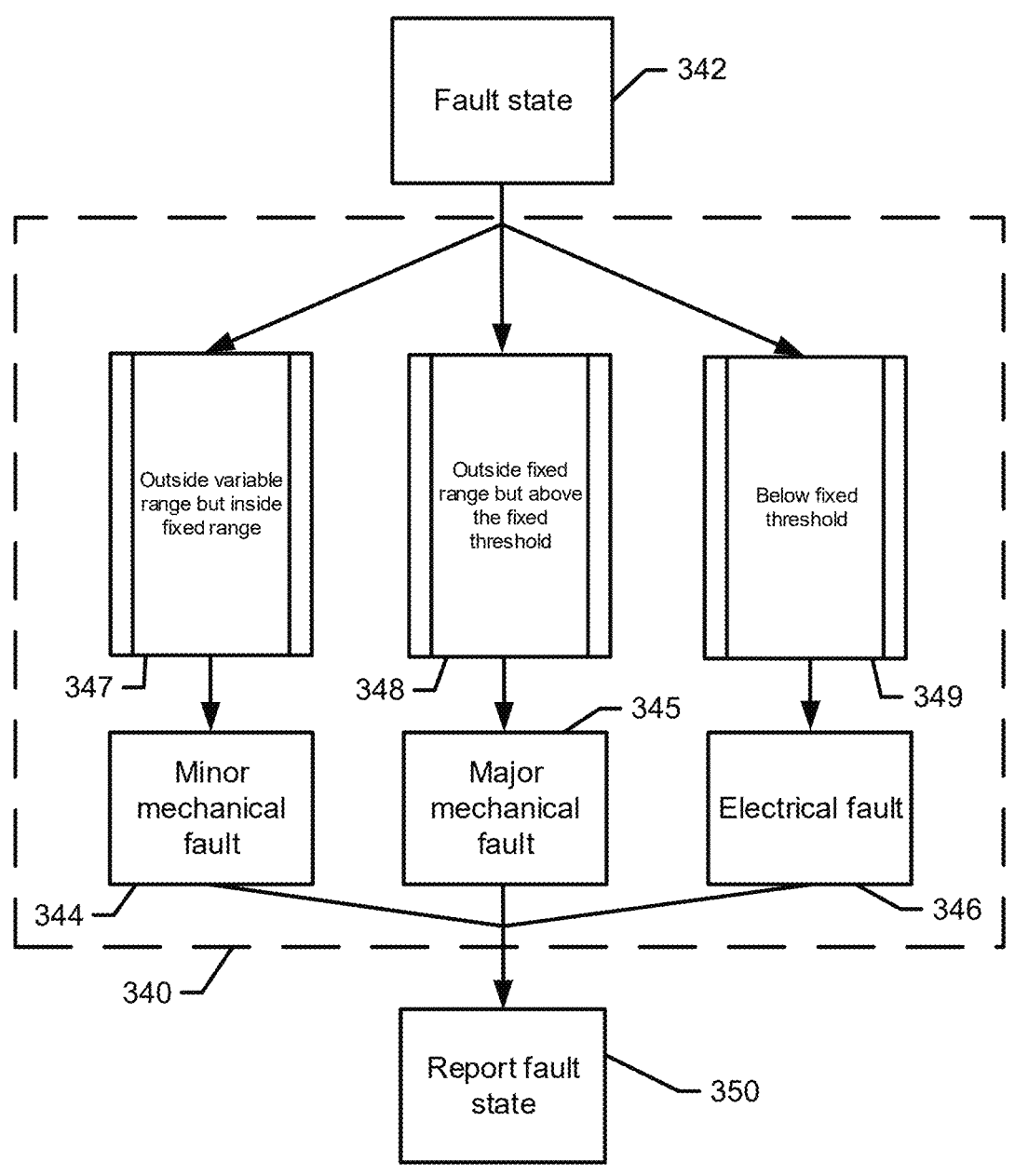
FIG. 4 illustrates a flow chart for classifying a fault state in accordance with an example embodiment.

FIG. 2 illustrates a flow chart for an algorithm 300 for detecting an operation state in an individual suspension height sensor 160 in accordance with an example embodiment. FIG. 3 and FIG. 4 illustrate more detailed flow charts for operations within the algorithm 300 in accordance with an example embodiment. The algorithm 300 may be run by the controller 200. The algorithm 300 initially may begin with determining a vehicle parameter at operation 310. In some cases, the vehicle parameter may be vehicle speed measured by a sensor within the control system 100. In an example embodiment, the vehicle parameter may be records of operator inputs, vehicle rate of change of velocity, or any number of parameters that may be measured by sensors and/or measurements from within the control system 100. In an example embodiment, more than one vehicle parameter may be determined by operation 310.

After the vehicle parameter may be determined, the algorithm 300 determines whether the vehicle may be in a steady-state condition based on the vehicle parameter at operation 315. The steady-state condition may be defined as occurring when the vehicle parameter may be detected as constant for a steady-state determination time period. In some cases, the vehicle 110 may not have a vehicle parameter be constant for an entire period of the steady-state determination time period, in which the steady-state condition may be defined as occurring when the vehicle parameter may be relatively constant (vehicle parameter values within a certain range or percentage of one another) for the steady-state determination time period. For instance, the vehicle parameter may be vehicle speed data. When vehicle speed data may be within a 5 mile per hour range for a steady-state determination time period of 10 seconds, the vehicle 110 may be determined to be in the steady-state condition. If the vehicle 110 is not determined to be at the steady-state condition, the algorithm 300 may return to or continue to determine the vehicle parameter at operation 310.

If the vehicle 110 is determined to be at the steady-state condition, the algorithm 300 may proceed to collecting current suspension height data at operation 330. The current suspension height data may be suspension height data collected from each respective one of the individual suspension height sensor 160 within a suspension height data collection time period. The suspension height data collection time period may overlap with the steady-state determination time period partially, fully, or not at all. In some cases, the suspension height data collection time period may be a brief time period directly after the steady-state determination time period. The suspension height data collection time period may only include a single value, a plurality of values, or an average of a plurality of values of current suspension height data.

After collection of the current suspension height data, the algorithm 300 may determine an operation state of each individual suspension height sensor 160 and whether each individual suspension height sensor 160 may be in a fault state 342 at operation 330. If the individual suspension height sensor 160 may be determined to be in the fault state 342, the fault state 342 may be classified in operation 340. To determine the operation state of each individual suspension height sensor 160, the algorithm 300 may compare the current suspension height data to a variable range 410, a fixed range 420, and a fixed threshold 430 shown in FIG. 5.

Figure 5:
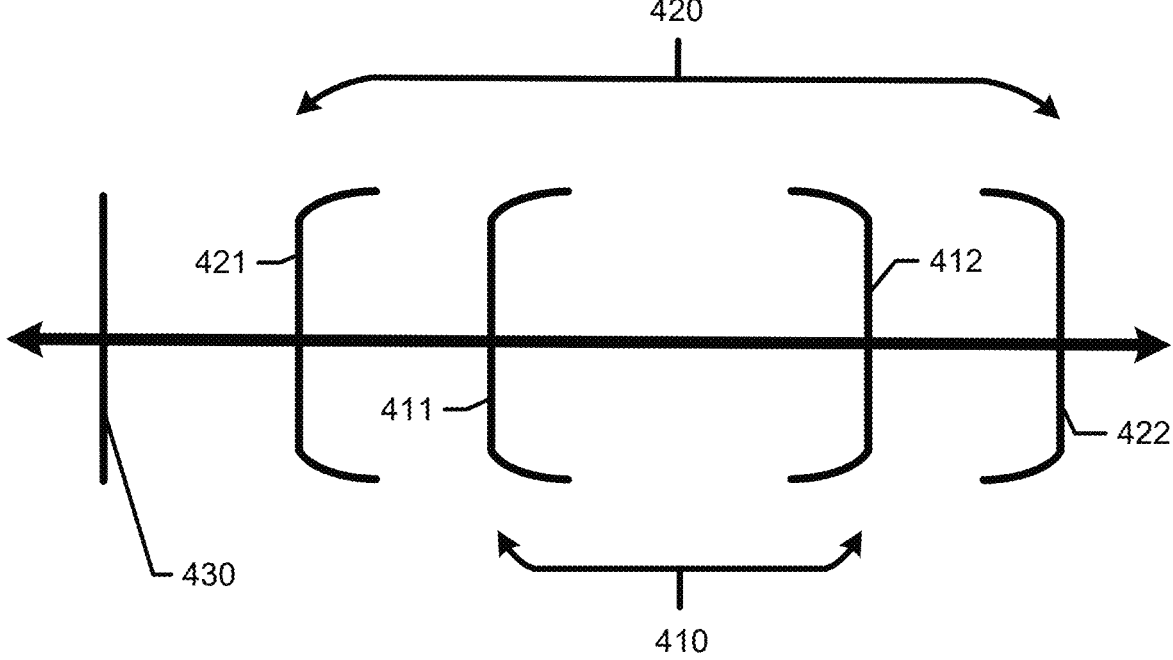
FIG. 5 illustrates a variable range, a fixed range, and a fixed threshold used in the control system for fault state determination and classification in accordance with an example embodiment.

FIG. 5 illustrates the variable range 410, the fixed range 420, and the fixed threshold 430 in accordance with an example embodiment. The variable range 410 may be determined and adjusted based on previous suspension height data. For instance, using previous suspension height data from each individual suspension height sensor 160, a variable range lower bound 411 and a variable range upper bound 412 of the variable range 410 may be determined. In some cases, the variable range lower bound 411 and the variable range upper bound 412 may be based on upper and lower data points of the previous suspension height data over a previous suspension height data time period. In an example embodiment, the variable range lower bound 411 and the variable range upper bound 412 may be based on deviation (percentage or fixed value) from an average of the previous suspension height data over the previous suspension height data time period or based on any other mathematical property or operation that may be used to adjust previous suspension height data. In some cases, the previous suspension height data time period may be an hour, day, week, month, or year. In an example embodiment, the algorithm 300 may perform trend analysis and compare current suspension height data to the variable range 410 created with the previous suspension height data of a smaller duration one of the suspension height data time periods to the variable range 410 created with the previous suspension height data of a larger duration one of the suspension height data time periods.

In some cases, the fixed range 420 may be a predetermined range set by a vehicle's manufacturer based on prior testing. The fixed range 420 may be based on the specific vehicle model, vehicle accessories, vehicle size, or any other vehicle feature that may affect suspension performance. In an example embodiment, the fixed range 420 may be always outside the variable range 410. The fixed range 420 may include a fixed range lower bound 421 and a fixed range upper bound 422.

In some cases, the fixed threshold 430 may be a predetermined value set by a vehicle's manufacturer. The fixed threshold 430 may be based on the specific type of individual suspension height sensor 160, or any other vehicle feature that may affect suspension performance. The fixed threshold 430 may be substantially below a fixed range lower bound 421 to indicate a different fault than the fixed range 420.

In an example embodiment, the variable range 410 may be used to determine if there is the fault state 342 present at operation 331. Responsive to determining that the fault state 342 is presented, the fixed range 420, and the fixed threshold 430 may be used to classify the fault state 342. If the current suspension height data is within the variable range 410, the operation state of the individual suspension height sensor 160 may be determined to be in a normal state 343. In some cases, if the current suspension height data may be within the variable range 410, the current suspension height data may additionally be within the fixed range 420 and above the fixed threshold 430. If the current suspension height data may be outside the variable range 410 but inside the fixed range 420, the fault state 342 may be determined to be occurring, as well as the fault state 342 may be further classified as a minor mechanical fault 344 at operation 347. In some cases, the minor mechanical fault 344 may be indicative of general sensor wear that may not need immediate replacement or correction such as where the sensor is still operable, but is operating in a degraded state that may render its readings less and less accurate over time.

In an example embodiment, if the current suspension height data may be outside the fixed range 420 but above the fixed threshold 430, the fault state 342 may be determined to be occurring, as well as the fault state 342 may be further classified as a major mechanical fault 345 at operation 348. In some cases, the major mechanical fault 345 may indicate a stuck sensor element, broken link arm, bent bracket, jammed sensor mechanism, or any other mechanical function that may render the individual suspension height sensor 160 impractical so that current suspension height data lacks accuracy and correlation to actual suspension height. The major mechanical fault 345 may require prompt replacement or maintenance to return the individual suspension height sensor 160 to the normal state 343.

In an example embodiment, if the current suspension height data is below the fixed threshold 430, the fault state 342 may be determined to be occurring, as well as the fault state 342 may be classified to be an electrical fault 346 at operation 349. In some cases, the electrical fault 346 may indicate an electrical short within the individual suspension height sensor 160. In an example embodiment, the fixed threshold 430 may be barely above 0 volts to indicate an electrical short may be present, while still allowing an indication if a major mechanical fault 345 or minor mechanical fault 344 may be present. The fixed threshold may be set by the vehicle's manufacturer as an electrical functioning limits of the individual suspension height sensor 160.

In some cases, if the fault state 342 may be determined to not be occurring and the individual suspension height sensor 160 may be determined to be in the normal state 343, the algorithm 300 may return to operation 310 to determine vehicle parameters.

In an example embodiment, algorithm 300 may report the fault state 342 in operation 350 upon determining and classifying the fault state 342 in operations 330 and 340. Depending on the classification of the fault state 342, the algorithm 300 may report the fault state 342 to different sources. In some cases, if the fault state 342 may be determined as a minor mechanical fault 344, a report may be delivered to an operator of the vehicle 110 via a display 112 or user interface 221 of the vehicle 110. In an example embodiment, the report may be an auditory, visual, or haptic indication that may be transmitted by the communication module 220 of the controller 200 to the operator of the vehicle 110. In some cases, the report may be transmitted by the communication module 220 to a service technician 352. In an example embodiment, the report may only be sent to the operator if the fault state 342 may be classified as the minor mechanical fault 344. In some cases, the report may be sent to both the operator and the service technician 352 if the fault state 342 may be classified as the major mechanical fault 345 or the electrical fault 346. In an example embodiment, even if the fault state 342 may be determined as occurring, a report may be sent to both, one, or neither of the operator and service technician 352. In some cases, the report sent to the service technician 352 may include vehicle specification and sensor specifications so that a replacement for the individual suspension height sensor 160 or specific component may be pre-ordered.

In an example embodiment, the algorithm 300 may determine the operation state utilizing only onboard vehicle resources. For example, the operation state may be determined without the use of an external database or external processing. In some cases, an external database of previous suspension height data may be used by the controller 200. In an example embodiment, the controller 200 may upload current suspension height data to an external controller. In some cases, the operation state and the fault state 342 may potentially be classified in a single cycle. The single cycle may only collect one set of current suspension height data and may not need iterative learning or machine learning to determine the operation state. In an example embodiment, machine learning or iterative learning may be used by the controller 200 to optimize the algorithm 300. In some cases, the variable range 410 may be determined via machine learning.

In an example embodiment, the variable range 410 may only be one of a plurality of variable ranges. Each variable range 410 of the plurality of variable ranges may be determined based on different ranges of the previous suspension height data time period. For example, the plurality of variable ranges may include a daily variable range, a weekly variable range, a monthly variable range, and a lifetime variable range. The plurality of variable ranges may be based on any number of the previous suspension height data time periods. In some cases, the algorithm 300 may utilize the plurality of variable ranges to perform trend analysis on the individual suspension height sensor 160. Trend analysis may be performed by comparing the current suspension height data to the plurality of variable ranges, as well as comparing the plurality of variable ranges to one another. In an example embodiment, the operation state may be determined via trend analysis.

In some cases, the algorithm 300 may include a plurality of fixed ranges. The plurality of fixed ranges may be set by the vehicle's manufacture to define specific mechanical functioning limits of the vehicle 110. The plurality of fixed ranges may be used in trend analysis similar to the plurality of variable ranges.

In an example embodiment, the algorithm 300 may include a plurality of fixed thresholds. The plurality of fixed thresholds may be set by the vehicle's manufacture to define electrical functioning limits of the vehicle 110. The electrical functioning limits may allow the determination if the electrical fault 346 may be a complete short or some other electrical issue. The plurality of fixed thresholds may be used in trend analysis similar to the plurality of variable ranges and the plurality of fixed ranges.

In some cases, trend analysis may be performed using the plurality of variable ranges, the plurality of fixed ranges, and the plurality of fixed thresholds together. In an example embodiment, the algorithm 300 may be run continuously and automatically by the controller 200.

FIG. 6 illustrates a block diagram of a method for determining an operation state of the individual suspension height sensor in accordance with an example embodiment. The method may include receiving current suspension height data and vehicle speed data at operation 600. The method may further include determining whether the vehicle maybe in a steady-state condition based on the vehicle speed data in operation 610. The method also may include, responsive to if in steady-state condition may be present, perform a comparison of the current suspension height data to the variable range, the fixed range, and the fixed threshold of suspension height data at operation 620. Finally, the method may include determining the operation state of the individual suspension height sensor based on the comparison at operation 630.

A control system for a suspension system of a vehicle may therefore be provided. The control system may include a set of suspension height sensors that may be operably coupled to a set of wheels of the vehicle for measuring current suspension height data, a vehicle speed sensor that may be operably coupled to the vehicle for measuring vehicle speed data; and a controller that may be operably coupled the set of suspension height sensors and the vehicle speed sensor. The set of suspension height sensors may include multiple instances of an individual suspension height sensor that may be operably coupled to corresponding ones of the set of wheels. The controller may be configured to receive the current suspension height data and the vehicle speed data, may determine whether the vehicle may be in a steady-state condition based on the vehicle speed data, responsive to the vehicle being may being determined to be in the steady-state condition, may perform a comparison of the current suspension height data to a variable range, a fixed range, and a fixed threshold of suspension height data; and may determine an operation state of the individual suspension height sensor based on the comparison.

The control system for a suspension system of a vehicle of some embodiments may include additional features, modifications, augmentations and/or the like to achieve further objectives or enhance performance of the suspension assembly. The additional features, modifications, augmentations and/or the like may be added in any combination with each other. Below is a list of various additional features, modifications, and augmentations that can each be added individually or in any combination with each other. For example, the comparison may classify the operation state as either a normal state or a fault state, and responsive to determining the operation state of the individual height sensor may be the fault state, the controller may classify a cause of the fault state based on the comparison. The cause of the fault state may be classified as either a mechanical fault or an electrical fault. In an example embodiment, responsive to the current suspension height data being within the variable range, the operation state may be classified as the normal state. In some cases, responsive to the current suspension height data being outside the variable range but within the fixed range, the operation state may be classified to be the fault state and further classified to be a minor mechanical fault. In an example embodiment, responsive to the current suspension height data being outside the fixed range but above the fixed threshold, the operation state may be classified to be the fault state and further classified to be a major mechanical fault. In some cases, responsive to the current suspension height data being below the fixed threshold, the operation state may be classified to be the fault state and further classified to be an electrical fault. In an example embodiment, the current suspension height data and the suspension height data may be voltage measurements. In some cases, the variable range may be within the fixed range, and the fixed threshold may be below a lower limit of the fixed range. In an example embodiment, the variable range may be adjusted based on previously measured suspension height data of the vehicle. In some cases, the fixed range may be predetermined based on vehicle classification or vehicle model prior to any operation of the vehicle. In an example embodiment, responsive to determining the operation state may be the fault state, the controller may report a cause of the fault state to an operator of the vehicle via a user interface or to a service technician depending on the cause of the fault state. In some cases, the controller may determine the operation state of the individual suspension height sensor via only onboard vehicle resources. In an example embodiment, the fault state of the individual suspension height sensor may be determined in a single cycle.

A method for determining an operation state in a suspension system element of a vehicle may be provided. The method may include receiving current suspension height data and vehicle speed data, may determine whether the vehicle may be in a steady-state condition based on the vehicle speed data, responsive to the vehicle being determined to be in the steady-state condition, may perform a comparison of the current suspension height data to a variable range, a fixed range, and a fixed threshold of suspension height data, and may determine the operation state of the individual suspension height sensor based on the comparison. The sensor suite may include a set of suspension height sensors that may be operably coupled to a set of wheels of the vehicle for measuring the current suspension height data and a vehicle speed sensor that may be operably coupled to vehicle for measuring the vehicle speed. The set of suspension height sensors may include multiple instances of individual suspension height sensor that may be operably coupled to corresponding ones of the set of wheels.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A control system for a suspension system of a vehicle, the control system comprising:

a set of suspension height sensors operably coupled to a set of wheels of the vehicle for measuring current suspension height data;

a vehicle speed sensor operably coupled to the vehicle for measuring vehicle speed data; and a controller operably coupled the set of suspension height sensors and the vehicle speed sensor, wherein the set of suspension height sensors comprises multiple instances of an individual suspension height sensor operably coupled to corresponding ones of the set of wheels, wherein the controller is configured to:

receive the current suspension height data and the vehicle speed data;

determine whether the vehicle is in a steady-state condition based on the vehicle speed data;

responsive to the vehicle being determined to be in the steady-state condition, perform a comparison of the current suspension height data to a variable range, a fixed range, and a fixed threshold of suspension height data; and determine an operation state of the individual suspension height sensor based on the comparison.

2. The control system of claim 1, wherein the comparison classifies the operation state as either a normal state or a fault state, wherein responsive to determining the operation state of the individual height sensor is the fault state, the controller further classifies a cause of the fault state based on the comparison, and wherein the cause of the fault state is classified as either a mechanical fault or an electrical fault.

3. The control system of claim 2, wherein responsive to the current suspension height data being within the variable range, the operation state is classified as the normal state.

4. The control system of claim 2, wherein responsive to the current suspension height data being outside the variable range but within the fixed range, the operation state is classified to be the fault state and further classified to be a minor mechanical fault.

5. The control system of claim 2, wherein responsive to the current suspension height data being outside the fixed range but above the fixed threshold, the operation state is classified to be the fault state and further classified to be a major mechanical fault.

6. The control system of claim 2, wherein responsive to the current suspension height data being below the fixed threshold, the operation state is classified to be the fault state and further classified to be an electrical fault.

7. The control system of claim 2, wherein responsive to determining the operation state is the fault state, the controller reports a cause of the fault state to an operator of the vehicle via a user interface or to a service technician depending on the cause of the fault state.

8. The control system of claim 1, wherein the variable range is within the fixed range and the fixed threshold is below a lower limit of the fixed range.

9. The control system of claim 1, wherein the variable range is adjusted based on previously measured suspension height data of the vehicle.

10. The control system of claim 1, wherein the fixed range is predetermined based on vehicle classification or vehicle model prior to any operation of the vehicle.

11. The control system of claim 1, wherein the current suspension height data and the suspension height data are voltage measurements.

12. The control system of claim 1, wherein the controller determines the operation state of the individual suspension height sensor via only onboard vehicle resources.

13. The control system of claim 1, wherein the operation state of the individual suspension height sensor is determined in a single cycle.

14. A method for determining an operation state in a suspension system element of a vehicle, the method comprising:

receiving current suspension height data and vehicle speed data, determining whether the vehicle is in a steady-state condition based on the vehicle speed data;

responsive to the vehicle being determined to be in the steady-state condition, performing a comparison of the current suspension height data to a variable range, a fixed range, and a fixed threshold of suspension height data; and determining the operation state of the individual suspension height sensor based on the comparison, wherein a set of suspension height sensors operably coupled to a set of wheels of the vehicle for measuring the current suspension height data and a vehicle speed sensor operably coupled to vehicle for measuring the vehicle speed, and wherein the set of suspension height sensors comprises multiple instances of individual suspension height sensor operably coupled to corresponding ones of the set of wheels.

15. The method of claim 14, wherein the comparison classifies the operation state as either a normal state or a fault state, wherein responsive to determining the operation state of the individual height sensor is the fault state, the method further includes classifying a cause of the fault state based on the comparison, and wherein the cause of the fault state is classified as either a mechanical fault or an electrical fault.

16. The method of claim 15, wherein responsive to the current suspension height data being within the variable range, the operation state is classified as the normal state.

17. The method of claim 15, wherein responsive to the current suspension height data being outside the variable range but within the fixed range, the operation state is classified to be the fault state and further classified to be a minor mechanical fault.

18. The method of claim 15, wherein responsive to the current suspension height data being outside the fixed range but above the fixed threshold, the operation state is classified to be the fault state and further classified to be a major mechanical fault.

19. The method of claim 15, wherein responsive to the current suspension height data being below the fixed threshold, the operation state is classified to be the fault state and further classified to be an electrical fault.

20. The method of claim 15, wherein responsive to determining the operation state is the fault state, the method further includes reporting a cause of the fault state to an operator of the vehicle via a user interface or to a service technician depending on the cause of the fault state.

* * * * *